US010723563B2

(12) United States Patent
Gu et al.

(10) Patent No.: US 10,723,563 B2
(45) Date of Patent: Jul. 28, 2020

(54) CONVEYING SYSTEM

(71) Applicant: ABB Schweiz AG, Baden (CH)

(72) Inventors: Hao Gu, Shanghai (CN); Zhaofu Chi, Shanghai (CN); Jibo Yang, Shanghai (CN)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/434,692

(22) Filed: Jun. 7, 2019

(65) Prior Publication Data
US 2019/0283974 A1  Sep. 19, 2019

Related U.S. Application Data

(63) Continuation of application No. PCT/CN2016/112373, filed on Dec. 27, 2016.

(51) Int. Cl.
*B65G 35/06* (2006.01)
*B65G 54/02* (2006.01)
*B65G 47/53* (2006.01)

(52) U.S. Cl.
CPC ............ *B65G 35/06* (2013.01); *B65G 47/53* (2013.01); *B65G 54/02* (2013.01)

(58) Field of Classification Search
CPC ........ B65G 54/02; B65G 47/53; B65G 47/54; B65G 35/06
See application file for complete search history.

(56) References Cited

U.S. PATENT DOCUMENTS 5,881,649 A * 3/1999 Hasegawa ......... H01L 21/67709
104/167
6,206,176 B1 * 3/2001 Blonigan .......... H01L 21/67709
198/619
(Continued)

FOREIGN PATENT DOCUMENTS

CN    1635974 A    7/2005
CN    1970410 A    5/2007
(Continued)

OTHER PUBLICATIONS

Intellectual Property Office of the P.R. China, International Search Report & Written Opinion issued in corresponding Application No. PCT/CN2016/112373, dated Sep. 29, 2017, 9 pp.
(Continued)

*Primary Examiner* — Mark A Deuble
(74) *Attorney, Agent, or Firm* — Taft Stettinius & Hollister LLP; J. Bruce Schelkopf

(57) ABSTRACT

A magnetic conveying system for moving object between a first transfer system and a second transfer system transversely arranged, includes: a first carrier for transferring the object, having a first magnetic engaging part; and a first drive member, having a second magnetic engaging part interacting with the first magnetic engaging part to move the first carrier in a first transfer direction of the first transfer system to a transverse section of the first transfer system and the second transfer system; at least a portion of the second magnetic engaging part is arranged in a space between the transverse section and the first magnetic engaging part crossing an edge of the transverse section. This is helpful for keeping the magnetic coupling above a predetermined level when the first carrier enters into the transverse section from the first transfer system or moves away from the transverse section towards the first transfer system.

19 Claims, 6 Drawing Sheets

(56) References Cited

U.S. PATENT DOCUMENTS

| | | | |
|---|---|---|---|
| 6,561,343 B2* | 5/2003 | Miyauchi | H01L 21/67709 |
| | | | 198/619 |
| 2008/0038020 A1* | 2/2008 | Chung | B65G 54/02 |
| | | | 399/253 |
| 2015/0303841 A1* | 10/2015 | Suzuki | H02P 6/006 |
| | | | 318/38 |
| 2016/0289011 A1* | 10/2016 | Itoh | B65G 37/00 |
| 2018/0162659 A1* | 6/2018 | Wipf | B65G 47/088 |
| 2018/0208414 A1 | 7/2018 | Gu et al. | |
| 2018/0229947 A1* | 8/2018 | Feyrer | B65G 54/02 |

FOREIGN PATENT DOCUMENTS

| | | | | |
|---|---|---|---|---|
| CN | 101809729 A | | 8/2010 | |
| CN | 202226323 U | | 5/2012 | |
| CN | 204802653 U | | 11/2015 | |
| CN | 105151803 A | | 12/2015 | |
| GB | 1272263 A | * | 4/1972 | B65G 35/06 |
| JP | S57162973 A | | 10/1982 | |
| JP | H10287233 A | | 10/1998 | |
| JP | 2001204108 A | | 7/2001 | |
| WO | 2017050524 A1 | | 3/2017 | |

OTHER PUBLICATIONS

The State Intellectual Property Office of the People's Republic of China, First Office Action issued in corresponding Chinese application No. 2016800914077, dated May 13, 2020, 15 pp.

The State Intellectual Property Office of the People's Republic of China, Search Report issued in corresponding Chinese application No. 2016800914077, dated May 13, 2020, 6 pp.

\* cited by examiner

CONVEYING SYSTEM

TECHNICAL FIELD

The invention relates to conveying system, and more particularly to conveying between different transfer systems.

BACKGROUND ART

In Computer, Communication and Consumer (3C) industries, a product needs to be assembled in a dustless environment. For example, as far as screen assembly is concerned, in order to achieve a higher dustless degree, a screen panel needs to be carried and conveyed by a supporting member in a clean room. Generally, the supporting member is driven by a rack-pinion mechanism through mechanical engagement or driven by a belt, a first roller, and a link plate through friction. In this case, particles generated by mechanical engagement or friction cannot be ignored.

In order to reduce the particles, Patent CN105151803A discloses a conveying apparatus having a carrier fixed with a magnetic rack and a group of magnetic gears rotatable about an axis. Where the multiple of magnetic gears are driven to rotate by their driving shaft, they drive the magnetic rack together with the carrier to move in a direction of the axis, by means of direct magnetic coupling with the magnetic rack or indirect coupling via another magnetic gear group.

For example, a case is considered in which the above conveying apparatuses are applied to a production process line each taking different transfer direction in a transverse arrangement. Two of the conveying apparatuses are placed adjacent to each other with a transverse section as a portion of one of the two conveying apparatuses. Therefore, when using the conveying apparatuses as a system for transferring the carrier, it is a matter of course that the above magnetic gear group is provided for each conveying apparatus so as to move the carrier along the first conveying apparatus, from the first convey apparatus to the second, and then along the second conveying apparatus, by rotating each driving shaft.

The conventional conveying apparatus having the above structure has the following problems. Since a displacement is present of the magnetic gear group of one of the transfer apparatuses at the transverse section, to smoothly move the carrier, it is necessary to match the magnetic gear group to the transverse section of the conveying apparatus. Unless properly arranging the matching, the carrier cannot be smoothly moved. Moreover, if magnetic coupling occurs effected by the magnet gear groups of the two conveying apparatuses, a purposed thrust of the carrier is not produced when it enters into or leaves the transverse section.

BRIEF SUMMARY OF THE INVENTION

Because the first transfer system and the second transfer system according to conventional solutions would have been partitioned by their respective profile, the second magnetic engaging part of the first transfer system would also be separated from the transverse section. Therefore, a displacement of the second magnetic engaging part would be produced at the transverse section. Because such displacement exists, matching the second magnetic engaging part to the transverse section becomes an issue when moving the first carrier from the first transfer system to the second transfer system.

According to one aspect of present invention, it provides a magnetic conveying system for moving object between a first transfer system and a second transfer system transversely arranged, including: a first carrier for transferring the object, having a first magnetic engaging part; and a first drive member, having a second magnetic engaging part interacting with the first magnetic engaging part of the first carrier to move the first carrier in a first transfer direction of the first transfer system to transverse section of the first transfer system and the second transfer system; wherein: at least a portion of the second magnetic engaging part is arranged in a space between the transverse section and the first magnetic engaging part of the first carrier crossing an edge of the transverse section. At least a portion of the second magnetic engaging part is arranged in a space between the transverse section and the first magnetic engaging part of the first carrier when the first carrier crosses an edge of the transverse section. This is helpful for keeping the magnetic coupling above a predetermined level when the first carrier enters into the transverse section from the first transfer system or moves away from the transverse section towards the first transfer system. Otherwise, the first carrier would not have sufficient drive force to complete the transfer between the transverse section and the first transfer system.

Preferably, the transverse section is a part of the second transfer system adjacent to the first transfer system.

Preferably, the conveying system further includes a second carrier for transferring the first carrier, having a third magnetic engaging part; and a second drive member, having a fourth magnetic engaging part interacting with the third magnetic engaging part of the second carrier to move the second carrier in a second transfer direction of the second transfer system towards or away from the transverse section.

Preferably, the first carrier is moved and secured to the second carrier at the transverse section.

Preferably, the first drive member has a first divided section and a second divided section; the second magnetic engaging part of the first divided section is arranged on the first transfer system to move the first carrier along a path of the first transfer system; and the second divided section is arranged on the second carrier.

Preferably, the conveying system further includes a clutch, being configured to secure the first divided section and the section divided section.

Preferably, the second carrier has a positioning member with a fifth magnetic engaging part to its end, being configured to protrude from the second carrier interacting with the first magnetic engaging part of the first carrier to hold the first carrier.

Preferably, the second carrier has a positioning member with a fifth magnetic engaging part to its end, being configured to protrude from the second carrier indirectly interacting with the first magnetic engaging part of the first carrier via the second magnetic engaging part of the second divided section to hold the first carrier.

Preferably, the first magnetic engaging part has a magnetic rack, having a plurality of magnetic rack magnetic teeth, adjacent ones of the magnetic rack magnetic teeth having different polarities; the second magnetic engaging part has at least one first magnetic gear connected to a shaft core member rotatable about an axis in the first transfer direction, respectively, wherein each first magnetic gear has a plurality of first magnetic gear magnetic teeth and adjacent ones of the first magnetic gear magnetic teeth have different polarities; and the power is transmittable to the magnetic rack through the at least one first magnetic gear so as to move it along the first transfer direction.

Because the protruding first magnetic gear is magnetically coupled to the first magnetic engaging part of the first carrier more intensely than the others, in the case that either the second carrier enters into the transverse section carrying the first carrier or leaves in the second transfer direction, a magnetic force will be given to the first magnetic engaging part of the first carrier pushing it to deviate from the second transfer direction. In order to reduce such negative effect, the conveying system further includes a controller; wherein: the first drive member further has a motor whose output shaft is connected to the shaft core member; and where the second carrier starts to move towards or away from the transverse section transferring the first carrier, the controller is adapted for controlling the motor to rotate the second magnetic engaging part in a compliant manner for a predetermined time interval.

Preferably, the transverse section has a releasing member, for pressing the positioning member away from the first carrier so as to release the first carrier from the second carrier when the first carrier leaves the transverse section.

BRIEF DESCRIPTION OF THE DRAWINGS

The subject matter of the invention will be explained in more detail in the following text with reference to preferred exemplary embodiments which are illustrated in the drawings, in which.

The reference symbols used in the drawings, and their meanings, are listed in summary form in the list of reference symbols. In principle, identical parts are provided with the same reference symbols in the figures.

PREFERRED EMBODIMENTS OF THE INVENTION

In the following description, for purposes of explanation and not limitation, specific details are set forth, such as particular circuits, circuit components, interfaces, techniques, etc. in order to provide a thorough understanding of the present invention. However, it will be apparent to one skilled in the art that the present invention may be practiced in other embodiments that depart from these specific details. In other instances, detailed descriptions of well-known methods and programming procedures, devices, and circuits are omitted so not to obscure the description of the present invention with unnecessary detail.

Figure 1A:
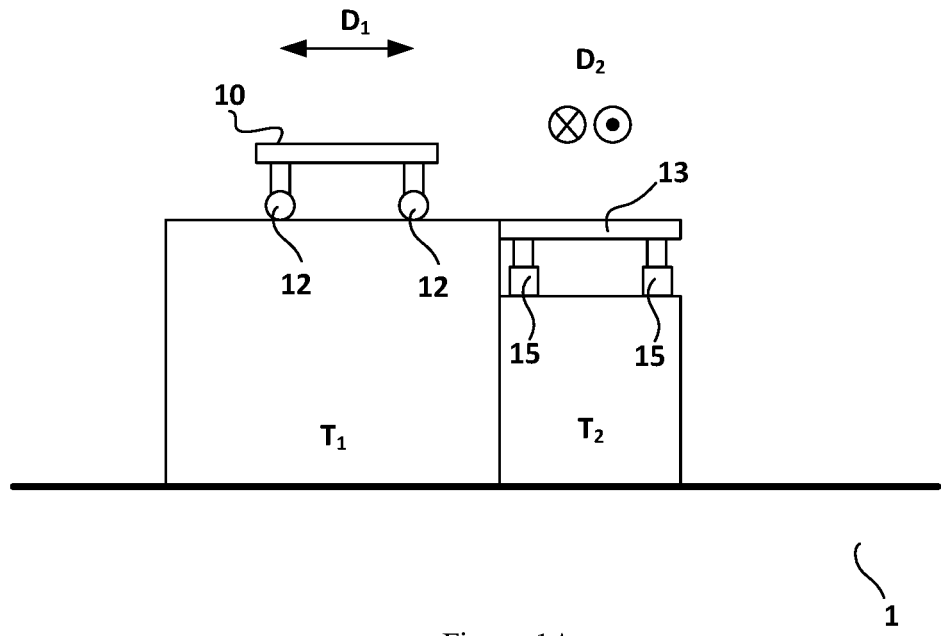
FIGS. 1A and 1B illustrate a front view and a top view of a conveying system according to an embodiment of present invention.
Figure 1B:
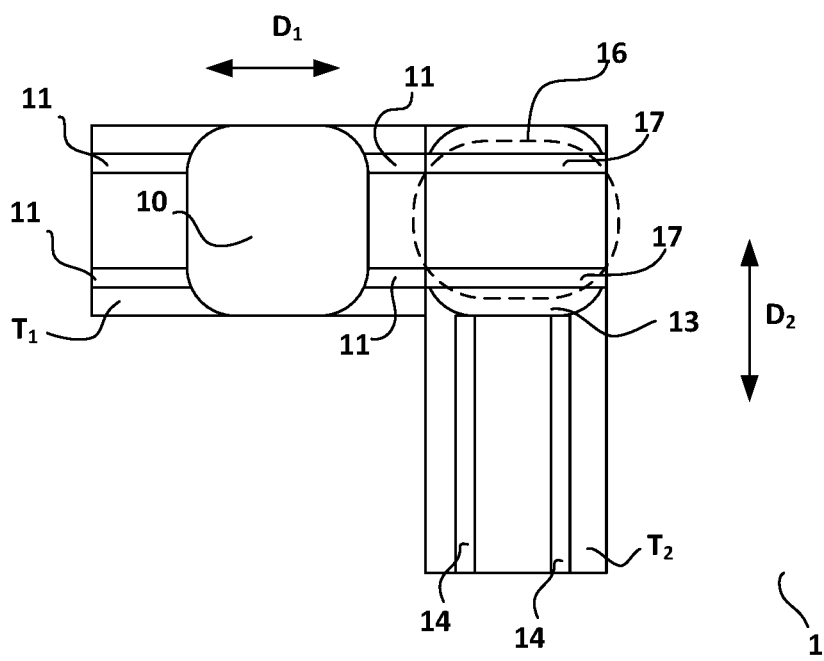

FIGS. 1A and 1B illustrate a front view and a top view of a conveying system according to an embodiment of present invention. As shown in FIGS. 1A and 1B, the conveying system 1 is for moving object between a first transfer system T1 and a second transfer system T2 which are transversely arranged. For example, the first transfer system T1 and the second transfer system T2 may be arranged substantially vertical to each other, or inclined to each other at an angle, so that the object may change its moving direction when it successively transfers in the first transfer system T1 and the second transfer system T2.

A first carrier 10, for example a shuttle, mounting the object to be transferred, is set on a pair of first guide rails 11 provided at the lower side and moves along the first guide rails 11 in a first transfer direction D1 of the first transfer system T1. The first guide rails 11 are arranged under the first carrier 10 on the first transfer system T1. A plurality of first rollers 12 for supporting the first carrier 10 are provided at lower portions of the first carrier 10. According to the above structure, the first carrier 10 is mounted on the first guide rails 11 supported with the first rollers 12 and is guided to move linearly by the first guide rails 11.

A second carrier 13, for carrying the first carrier 10 together with the object to be transferred, is set on a pair of second guide rails 14 provided at the lower side and moves along the second guide rails 14 in a second transfer direction D2 of the second transfer system T2. The second guide rails 14 are arranged under the second carrier 13 on the second transfer system T2. A plurality of second rollers 15 for supporting the second carrier 13 are provided at lower portions of the second carrier 13. According to the above structure, the second carrier 13 is mounted on the second guide rails 14 supported with the second rollers 15 and is guided to move linearly by the second guide rails 14.

A transverse section 16 may be a part of the second transfer system adjacent to the first transfer system. For example, the transverse section 16 of the first transfer system T1 and the second transfer system T2 is formed defined by imaginary lines extending from the first guide rails 11 on the second transfer system T2, which is a part of the second transfer system T2 adjacent to the first transfer system T1. A third guide rails 17 are provided on the second carrier 13 to the opposite side of the second guide rails 14, which are displaced by the same interval as that for the first guide rails 11 and are arranged at the same height as that for the first guide rails 11. Where the second carrier 13 is moved to the transverse section 16, the third guide rails 17 may be matched with the first guide rails 11 so that guide rails are continuous from the first transfer system T1 to the second transfer system T2.

The first carrier 10 may first enter the first transfer system T1, pass through the first transfer system T1 in the first transfer direction D1, then transfer to the second carrier 13 resting on the transverse section 16, and it is successively carried by the second carrier 13 along the second transfer system T2 in the second transfer direction D2.

Figure 2A:
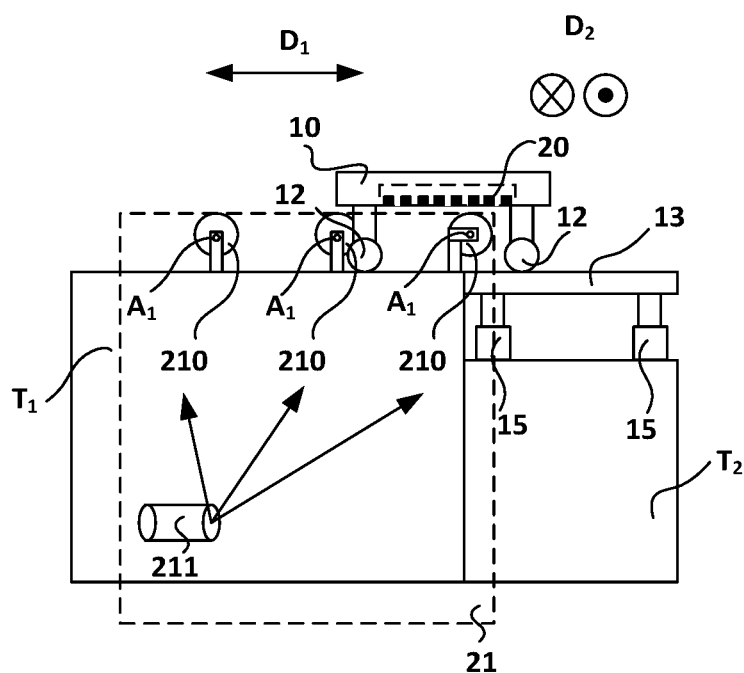
FIGS. 2A and 2B illustrates driving system of the conveying system according to an embodiment of present invention.
Figure 2B:
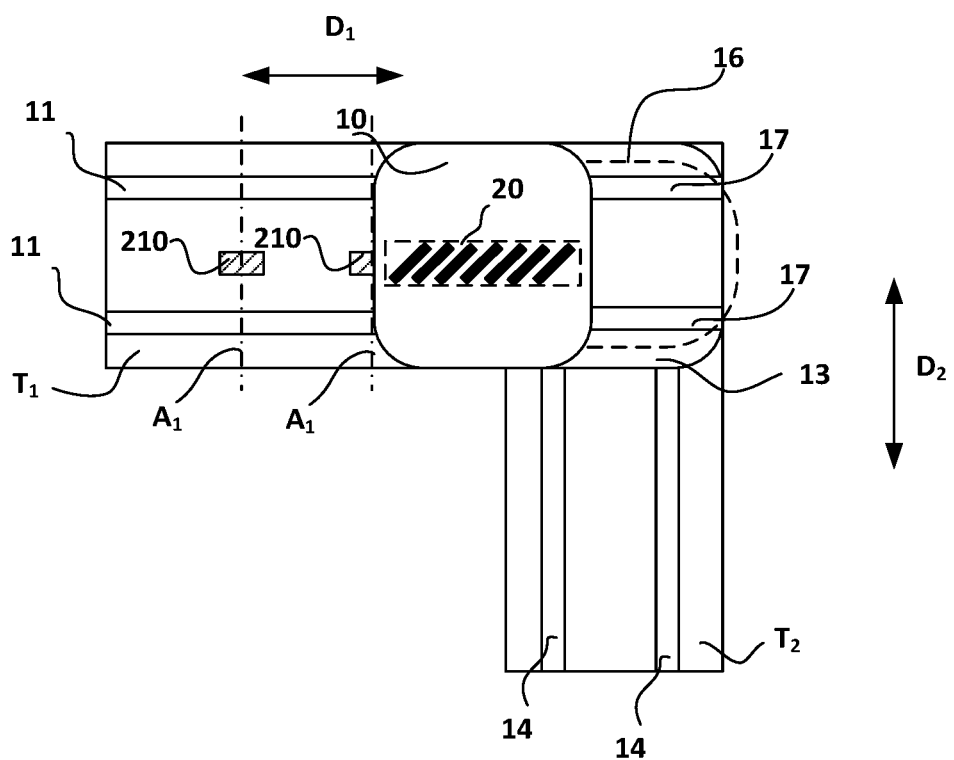

FIGS. 2A and 2B illustrates driving system of the conveying system according to an embodiment of present invention. As shown in FIGS. 2A and 2B, the first carrier 10 moves on two first guide rails 11 arranged in parallel with a predetermined interval. The object to be transferred is mounted on the first carrier 10. When the first carrier 10 receives a driving force for movement, it moves by being supported and guided by the first guide rails 11 provided with the first rollers 12. The first carrier 10 has a first magnetic engaging part 20, for example, a magnetic rack secured to the bottom of the first carrier 10, which has a plurality of magnetic rack magnetic teeth arranged in the first transfer direction D1, adjacent ones of the magnetic rack magnetic teeth having different polarities. The first magnetic engaging part 20 linearly slides by receiving a driving force from a first drive member 21 (shown by the dash-box) having a drive 211 and a second magnetic engaging part 210 of a rotational driving member to be described later. When the first magnetic engaging part 20 moves, the first carrier 10 integrated with the first magnetic engaging part 20 also moves. Therefore, the first carrier 10 moves by receiving a magnetic driving force from the second magnetic engaging part 210.

The second magnetic engaging part for supplying a driving force for linearly moving the first carrier 10 provided with the first rollers 12 are arranged along the first guide rails 11. The second magnetic engaging part includes at least one first magnetic gear 210 rotatable about at least one first shaft along first axis A1, respectively, wherein each first magnetic gear 210 has a plurality of first magnetic gear magnetic teeth and adjacent ones of the first magnetic gear magnetic teeth have different polarities. It receives power (the driving force) from drive 211 of a motor or the like and rotates in the normal or reverse directions. The respective first axes A1 are arranged in parallel with each other, and are arranged substantially perpendicular or inclined to the first transfer direction D1. By using bevel gear as the first magnetic gear 210 and bevel rack as the first magnetic engaging part 20 or conical gear as the first magnetic gear 210 and straight rack as the first magnetic engaging part 20, the first magnetic engaging part 20 receives power (the driving force) from drive 211 of a motor or the like and rotates in the normal or reverse directions.

Moreover, because the first transfer system T1 and the second transfer system T2 according to conventional solutions would have been partitioned by their respective profile, the second magnetic engaging part 210 of the first transfer system T1 would also be separated from the transverse section 16. Therefore, a displacement of the second magnetic engaging part 210 would be produced at the transverse section 16. Because such displacement exists, matching the second magnetic engaging part 210 to the transverse section 16 becomes an issue when moving the first carrier 10 from the first transfer system T1 to the second transfer system T2.

At least a portion of the second magnetic engaging part is arranged in a space between the transverse section 16 and the first magnetic engaging part 20 of the first carrier 10 when the first carrier 10 crosses an edge of the transverse section 16. For example as shown in FIGS. 2A and 2B, at least one first magnetic gear 210 is located protruding to the above of the transverse section 16. The shaft A1 for such protruding first magnetic gear 210 is secured to a portion of the first transfer system T1 extending to the above of the transverse section 16, as well. Such protruding first magnetic gear 210 together with the other first magnetic gear 210 are ratatably supported by the respective of the shafts A1 secured to the first transfer system T1 and arranged below the first magnetic engaging part 20 of the first carrier 10. They have a function for moving the first carrier 10 forward or backward along the first transfer direction D1 in accordance with the magnetic coupling action between the first magnetic engaging part 20 and themselves. In the case of forward direction where the first carrier 10 enters into the transverse section 16 from the first transfer system T1, even where the whole part of the first magnetic engaging part 20 has entered into the transverse section 16, the magnetic coupling between the first magnetic engaging part 20 and the other first magnetic gear 210 become insignificant as compared with the protruding first magnetic gear 210 because the latter is still kept nearby the first magnetic engaging part 20, in particular above the transverse section 16 and below the first magnetic engaging part 20 of the first carrier 10. Due to such maintained vicinity, an effect of the magnetic coupling by the protruding first magnetic gear 210 keeps substantially constant above a predetermined level. This is helpful for moving the first carrier 10 onto the second carrier 13 resting at the transverse section 16 along the first guide rails 11 and the third guide rails 17. On the other side, in the case of backward direction where the first carrier 10 leaves the transverse section 16 for the first transfer system T1, even where the whole part of the first magnetic engaging part 20 is still located in the transverse section 16, due to similar analysis, the effect of the magnetic coupling by the protruding first magnetic gear 210 keeps substantially constant above a predetermined level, which makes it possible to move the first carrier 10 away from the second carrier 13 resting at the transverse section 16 along the first guide rails 11 and the third guide rails 17.

Figure 3A:
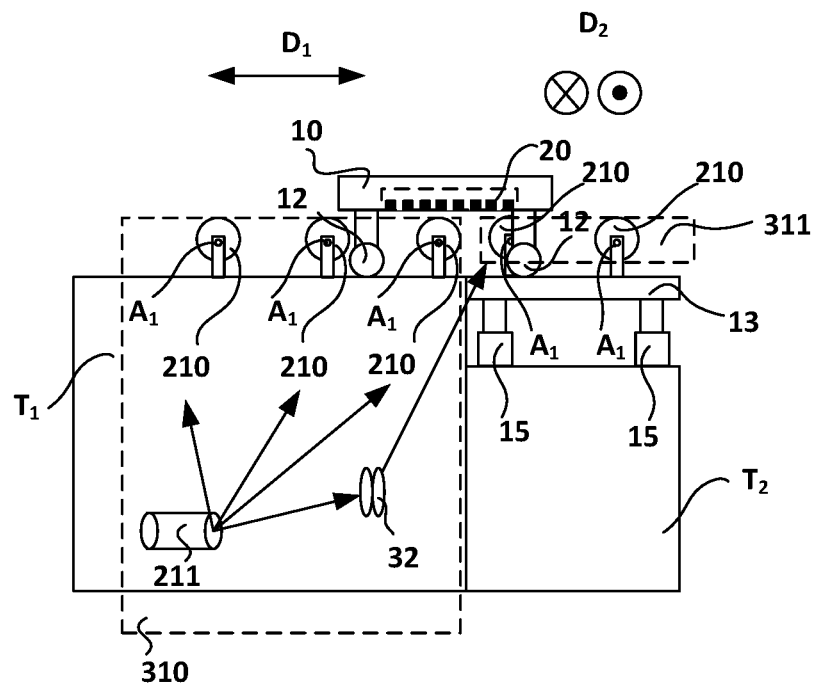
FIGS. 3A and 3B illustrate driving system of the conveying system according to another embodiment of present invention.
Figure 3B:
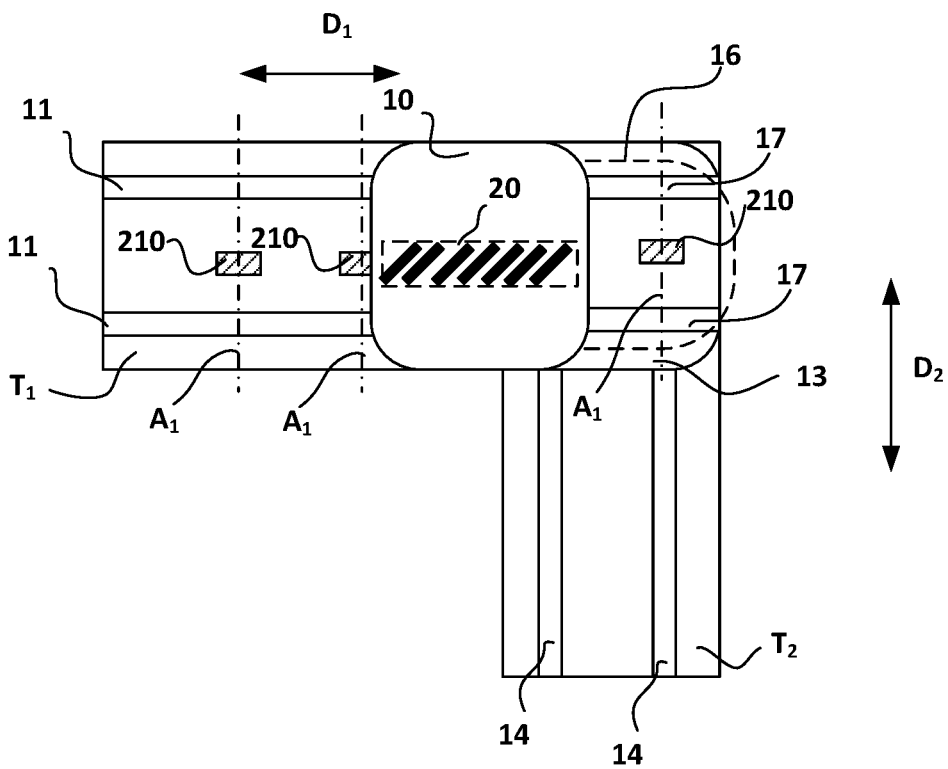

FIGS. 3A and 3B illustrate driving system of the conveying system according to another embodiment of present invention. For the purpose of concise and clarity, only features different based on that of FIGS. 2A and 2B are described. As shown in FIG. 3, instead of having a protruding first magnetic gear 210 and a protruding portion of the first transfer system T1, the first drive member 31 has a first divided section 310 and a second divided section 311. The second magnetic engaging part of the first divided section 310 (shown by the dash-box) includes at least one first magnetic gear 210 rotatable about at least one first shaft along first axis A1 secured to the first transfer system T1 to move the first carrier 10 along a path of the first transfer system T1. The second magnetic engaging part of the second divided section 311 (shown by the dash-box) includes at least one first magnetic gear 210 rotatable about at least one first shaft along first axis A1 secured to the second carrier 13 to move the first carrier 10 above entering into or leaving the transverse section 16. Therefore, the second magnetic engaging part of the second divided section 311, as a portion of the second magnetic engaging part of the first drive member 31, is arranged in a space between the transverse section 16 and the first magnetic engaging part 20 of the first carrier 10 when the first carrier 10 crosses an edge of the transverse section 16. For both of the cases of transfer in forward and backward direction, due to similar analysis, the effect of the magnetic coupling by the second magnetic engaging part of the second divided section 311 keeps substantially constant above a predetermined level, which make it possible to have enough magnetic coupling force to move the first carrier 10 onto or away from the second carrier 13 resting at the transverse section 16 along the first guide rails 11 and the third guide rails 17.

Figure 4A:
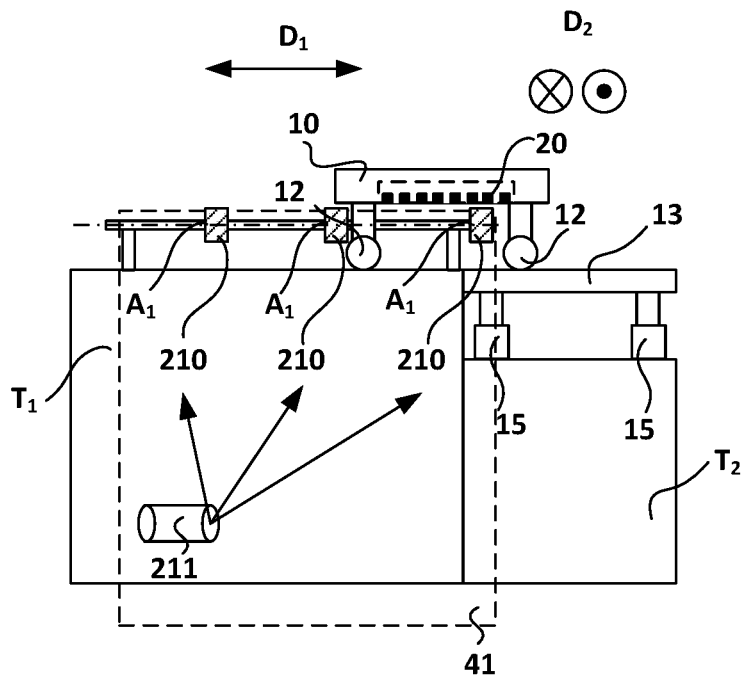
FIGS. 4A and 4B illustrate driving system of the conveying system according to another embodiment of present invention.
Figure 4B:
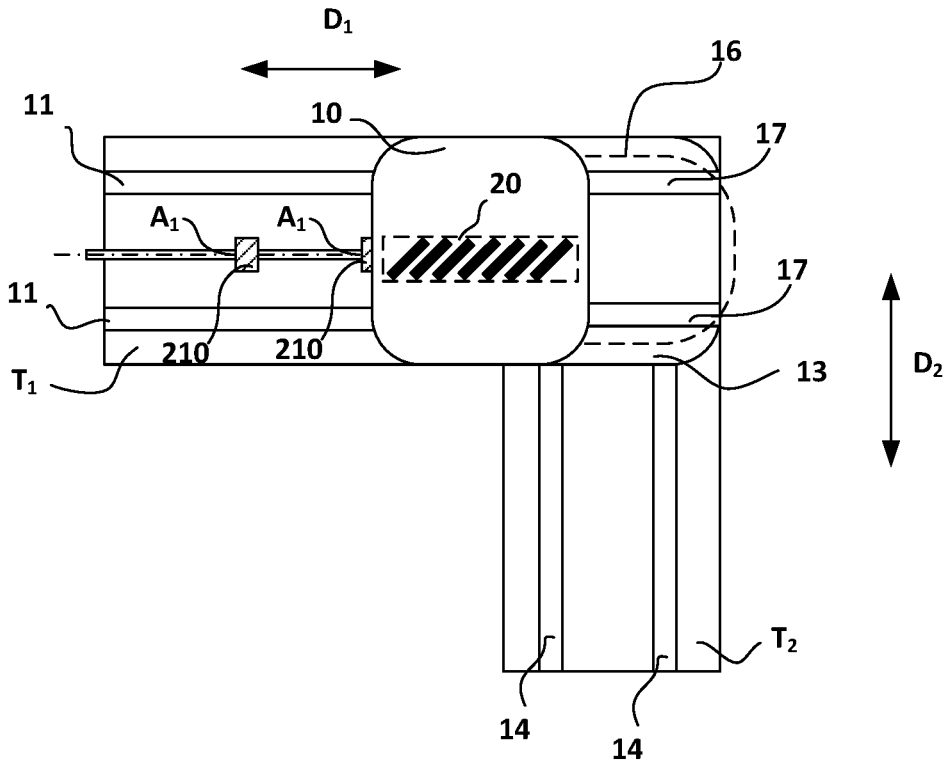

FIGS. 4A and 4B illustrate driving system of the conveying system according to another embodiment of present invention. For the purpose of concise and clarity, only features different based on that of FIGS. 2A and 2B are described. As shown in FIG. 4, the second magnetic engaging part of the first drive member 41 includes at least one first magnetic gear 210 rotatable about at least one first shaft along first axis A1 secured to the first transfer system T1 below the first carrier 10. The respective first axes A1 are arranged co-axially and the first axis A1 and the first transfer direction D1 are arranged substantially in parallel with each other. At least one first magnetic gear 210 rotatably supported on one end of the first shaft A1 is located protruding to the above of the transverse section 16. Therefore, the protruding first magnetic gear 210, as a portion of the second magnetic engaging part of the first drive member 41, is arranged in a space between the transverse section 16 and the first magnetic engaging part 20 of the first carrier 10 when the first carrier 10 crosses an edge of the transverse section 16. For both of the cases of transfer in forward and backward direction, due to similar analysis, the effect of the magnetic coupling by the second magnetic engaging part of the first drive member 41 keeps substantially constant above a predetermined level, which make it possible to have enough magnetic coupling force to move the first carrier 10 onto or away from the second carrier 13 resting at the transverse section 16 along the first guide rails 11 and the third guide rails 17.

Figure 5A:
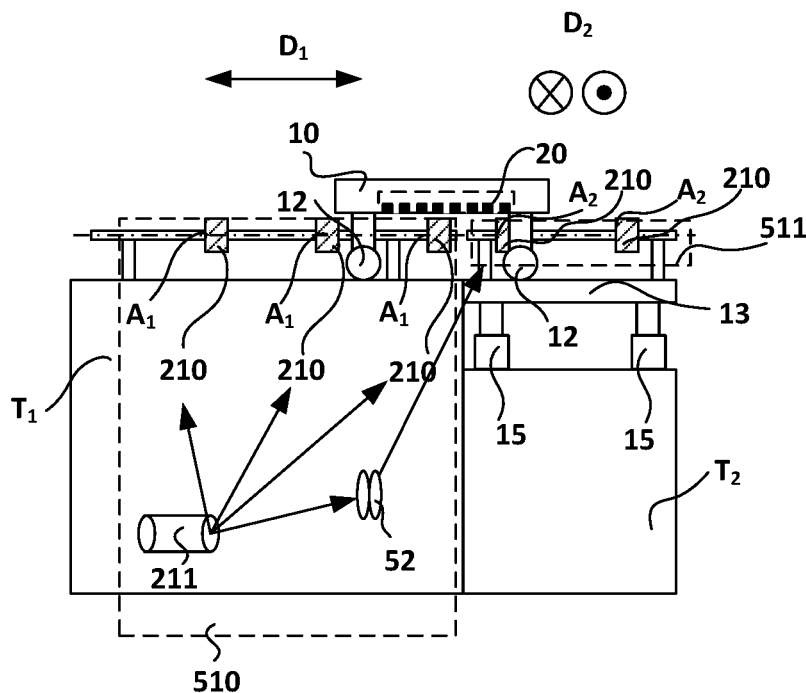
FIGS. 5A and 5B illustrate driving system of the conveying system according to another embodiment of present invention.
Figure 5B:
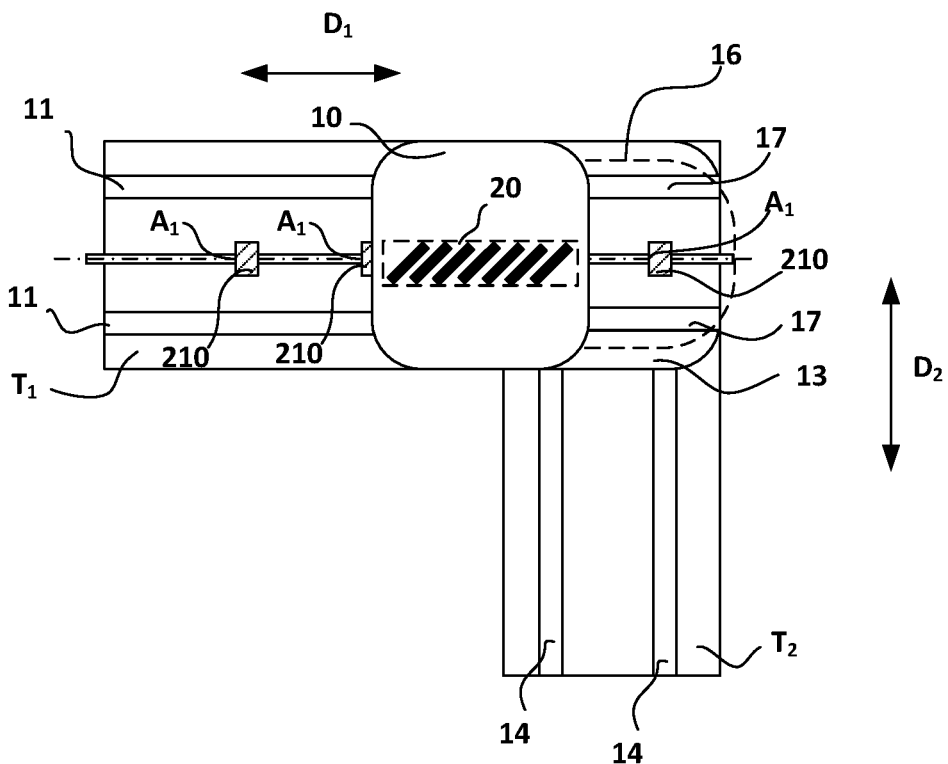

FIGS. 5A and 5B illustrate driving system of the conveying system according to another embodiment of present invention. For the purpose of concise and clarity, only features different based on that of FIGS. 4A and 4B are described. As shown in FIG. 5, instead of having a protruding first magnetic gear 210 and a protruding portion of the first shaft A1, the first drive member 51 has a first divided section 510 and a second divided section 511. The second magnetic engaging part of the first divided section 510 includes at least one first magnetic gear 210 rotatable about a first shaft along first axis A1 secured to the first transfer system T1 to move the first carrier 10 along a path of the first transfer system T1. The second magnetic engaging part of the second divided section 511 includes at least one first magnetic gear 210 rotatable about a second shaft along second axis A2 secured to the second carrier 13 to move the first carrier 10 above entering into or leaving the transverse section 16. Therefore, where the first carrier 10 crosses an edge of the transverse section 16 to move onto or leave the second carrier 13, the second magnetic engaging part of the second divided section 511, as a portion of the second magnetic engaging part of the first drive member 51, is arranged in a space between the transverse section 16 and the first magnetic engaging part 20 of the first carrier 10. For both of the cases of transfer in forward and backward direction, due to similar analysis, the effect of the magnetic coupling by the second magnetic engaging part of the second divided section 511 keeps substantially constant above a predetermined level, which make it possible to have enough magnetic coupling force to move the first carrier 10 onto or away from the second carrier 13 resting at the transverse section 16 along the first guide rails 11 and the third guide rails 17. It is preferably that the first shaft A1 and the second shaft A2 are arranged in line where the second carrier 13 is located in the transverse section 16 for communicating the first carrier 10. A clutch 52 may be provided to secure the first divided section 510 and the section divided section 511. The drive 211 may power to the second divided section 511 though the first divided section 510. The first shaft A1 and the second shaft A2 are constituted so as to rotate simultaneously. This increases the smoothness of commutation of the first carrier 10 between the first transfer system T1 and the second carrier 13 of the second transfer system T2, and at the same time. In addition, this reduces the complexity and cost of the system because there is no need for a separate drive for driving the second shaft A2.

Preferably, the second carrier 13 has a third magnetic engaging part and a second drive member. The second drive member has a fourth magnetic engaging part interacting with the third magnetic engaging part of the second carrier 13 to move the second carrier 13 in the second transfer direction D2 of the second transfer system T2 towards or away from the transverse section 16.

Figure 6:
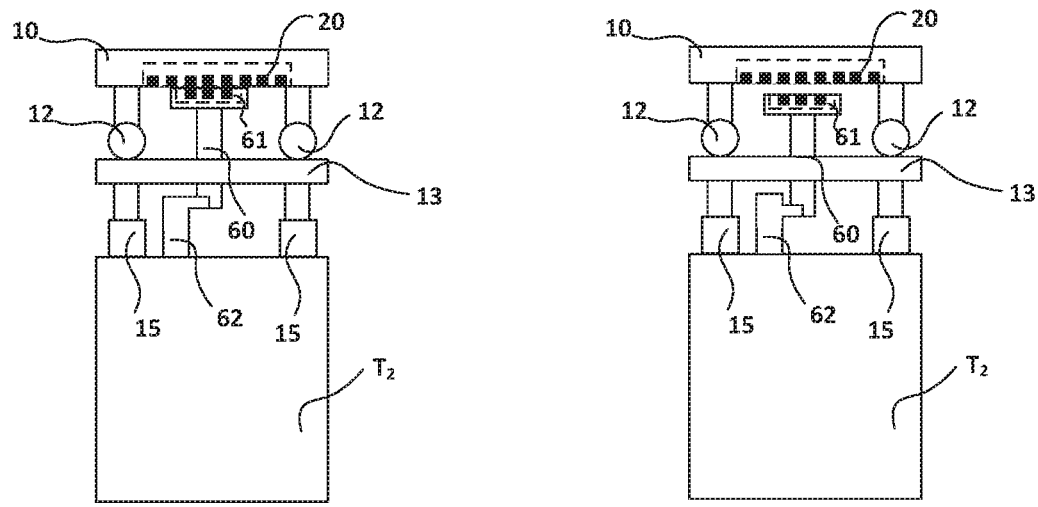
FIG. 6 illustrates two states of the mechanism for securing the first carrier to the second carrier at the transverse section according to an embodiment of present invention.

FIG. 6 illustrates two states of the mechanism for securing the first carrier to the second carrier at the transverse section according to an embodiment of present invention. As shown in FIG. 6, the second carrier 13 has a positioning member 60 with a fifth magnetic engaging part 61 to its end, which may protrude from the second carrier 13 interacting with the first magnetic engaging part 20 of the first carrier 10 to hold the first carrier 10. The positioning member 60 may be shaped like a rod, which is inserted and fitted into a through hole (not shown) formed through the second carrier 13. The axial direction of the hole is arranged substantially perpendicular to the third guide rails 17 towards the first magnetic engaging part 20 where the first carrier 10 rests at the desired mounting location on the second carrier 13. The fifth magnetic engaging part 61 is fixed to the end of the rod closer to the first carrier 10 at the desired mounting location.

In the holding state (as shown in the left side) where the first carrier 10 rests at the desired mounting location on the second carrier 13, the fifth magnetic engaging part 61 of the positioning member 60 is magnetically coupled with the first magnetic engaging part 20 of the first carrier 10, thus the securing is established between the first carrier 10 and the second carrier 13 via the positioning member 60 and the fifth magnetic engaging part 61. When moving the second carrier 13, the movement is transmitted to the first carrier 10 following the movement.

In the releasing state (as shown in the right side), the positioning member 60 is set to position where a predetermined gap is present between the fifth magnetic engaging part 61 of the positioning member 60 magnetic coupling with the first magnetic engaging part 20 of the first carrier 10. The magnetic coupling thus becomes weak not be able to secure the first magnetic engaging part 20 of the first carrier 10. Therefore, the first carrier 10 is released from the second carrier 13.

By reciprocating the positioning member 60 in the through hole, the holding state may be changed to the releasing state, or vice versa.

The transverse section 16 may have a releasing member, for pressing the positioning member 60 away from the first carrier 10 so as to release the first carrier 10 from the second carrier 13 when the first carrier 10 leaves the transverse section 16. For example the releasing member 62 may be a linear actuator mounted at the transverse section 16 with a hook secured to an end of its sliding tube or a cam.

Figure 7:
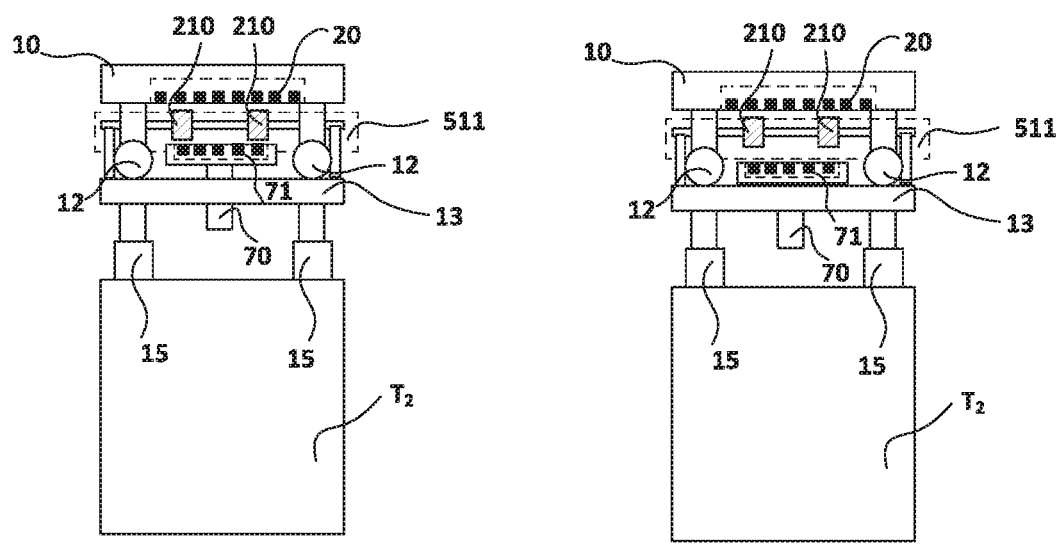
FIG. 7 illustrates two states of the mechanism for securing the first carrier to the second carrier at the transverse section according to another embodiment of present invention.

FIG. 7 illustrates two states of the mechanism for securing the first carrier to the second carrier at the transverse section according to another embodiment of present invention. As shown in FIG. 7, the second carrier 13 has a positioning member 70 with a fifth magnetic engaging part 71 to its end, which may protrude from the second carrier 13 indirectly interacting with the first magnetic engaging part 20 of the first carrier 10 via the second magnetic engaging part of the second divided section 311, 511 to hold the first carrier 10. Different from the embodiment according to FIG. 6 is that the second carrier 13 has the second magnetic engaging part of the second divided section 511. It includes at least one first magnetic gear 210 rotatable about a second shaft along second axis A2 secured to the second carrier 13 (see FIG. 5). Because the effect of the magnetic coupling by the second magnetic engaging part of the second divided section 511 keeps substantially constant above a predetermined level, which make it possible to have enough magnetic coupling force to move the first carrier 10 onto or away from the second carrier 13 by rotating the at least one first magnetic gear 210. On the other side, where the first magnetic gear 210 is blocked from rotation, the magnetic coupling applied to the first magnetic engaging part 20 of the first carrier 10 will remain unchanged applying a hold force to the first magnetic engaging part 20. The axial direction of the hole is arranged substantially perpendicular to the third guide rails 17 towards the first magnetic gear 210.

In the holding state (as shown in the left side) where the first carrier 10 rests at the desired mounting location on the second carrier 13, the fifth magnetic engaging part 71 of the positioning member 70 is magnetically coupled with the first magnetic gear 210 of the second carrier 13, thus the securing is established between the first carrier 10 and the second carrier 13 via the first magnetic engaging part 20, the first magnetic gear 210, the fifth magnetic engaging part 71, and the positioning member 70. When moving the second carrier 13, the movement is transmitted to the first carrier 10 following the movement.

In the releasing state (as shown in the right side), the positioning member 70 is set to position where a predetermined gap is present between the fifth magnetic engaging part 71 and the first magnetic gear 210. The magnetic coupling thus becomes weak not be able to secure the first magnetic engaging part 20 of the first carrier 10. Therefore, the first carrier 10 is released from the second carrier 13.

By reciprocating the positioning member 70 in the through hole, the holding state may be changed to the releasing state, or vice versa.

Because the protruding first magnetic gear 210 is magnetically coupled to the first magnetic engaging part 20 of the first carrier 10 more intensely than the others, in the case that either the second carrier 13 enters into the transverse section 16 carrying the first carrier 10 or leaves in the second transfer direction D2, a magnetic force will be given to the first magnetic engaging part 20 of the first carrier 10 pushing it to deviate from the second transfer direction D2. In order to reduce such negative effect, the conveying system further includes a controller. When the second carrier starts to move towards or away from the transverse section 16 transferring the first carrier 10, the controller is adapted for controlling the motor 211 to rotate the second magnetic engaging part 210 in a compliant manner for a predetermined time interval. For example, corresponding to the movement of the first carrier 10, the second magnetic engaging part 210 is rotated in a direction same as that for moving the first carrier 10 towards or away from the transverse section 16 for a predetermined time interval.

Though the present invention has been described on the basis of some preferred embodiments, those skilled in the art should appreciate that those embodiments should by no way limit the scope of the present invention. Without departing from the spirit and concept of the present invention, any variations and modifications to the embodiments should be within the apprehension of those with ordinary knowledge and skills in the art, and therefore fall in the scope of the present invention which is defined by the accompanied claims.

The invention claimed is:

1. A magnetic conveying system for moving an object between a first transfer system and a second transfer system transversely arranged, including:
   a first carrier for transferring the object, having a first magnetic engaging part;
   a first drive member, having a second magnetic engaging part interacting with the first magnetic engaging part of the first carrier to move the first carrier in a first transfer direction of the first transfer system to a transverse section of the first transfer system and the second transfer system;
   a second carrier for transferring the first carrier, having a third magnetic engaging part; and
   a second drive member, having a fourth magnetic engaging part interacting with the third magnetic engaging part of the second carrier to move the second carrier in a second transfer direction of the second transfer system towards or away from the transverse section;
   wherein:
   at least a portion of the second magnetic engaging part is arranged in a space between the transverse section and the first magnetic engaging part of the first carrier crossing an edge of the transverse section.

2. The conveying system according to claim 1, wherein:
   the transverse section is a part of the second transfer system adjacent to the first transfer system.

3. The conveying system according to claim 1, wherein:
   the first carrier is moved and secured to the second carrier at the transverse section.

4. The conveying system according to claim 1, wherein:
   the first drive member has a first divided section and a second divided section;
   the second magnetic engaging part of the first divided section is arranged on the first transfer system to move the first carrier along a path of the first transfer system; and
   the second divided section is arranged on the second carrier.

5. The conveying system according to claim 4, further including:
   a clutch, being configured to secure the first divided section and the second divided section.

6. The conveying system according to claim 1, wherein:
   the second carrier has a positioning member with a fifth magnetic engaging part to its end, being configured to protrude from the second carrier interacting with the first magnetic engaging part of the first carrier to hold the first carrier.

7. The conveying system according to claim 4, wherein:
   the second carrier has a positioning member with a fifth magnetic engaging part to its end, being configured to protrude from the second carrier indirectly interacting with the first magnetic engaging part of the first carrier via the second magnetic engaging part of the second divided section to hold the first carrier.

8. The conveying system according to claim 1, wherein:
   the first magnetic engaging part has a magnetic rack, having a plurality of magnetic rack magnetic teeth, adjacent ones of the magnetic rack magnetic teeth having different polarities;
   the second magnetic engaging part has at least one first magnetic gear connected to a shaft core member rotatable about an axis in the first transfer direction, respectively, wherein each first magnetic gear has a plurality of first magnetic gear magnetic teeth and adjacent ones of the first magnetic gear magnetic teeth have different polarities; and
   the power is transmittable to the magnetic rack through the at least one first magnetic gear so as to move it along the first transfer direction.

9. The conveying system according to claim 7, further including:
   a controller;
   wherein:
   the first drive member further has a motor whose output shaft is connected to the shaft core member; and
   where the second carrier starts to move towards or away from the transverse section transferring the first carrier, the controller is adapted for controlling the motor to rotate the second magnetic engaging part in a compliant manner for a predetermined time interval.

10. The conveying system according to claim 5, wherein:
the transverse section has a releasing member, for pressing the positioning member away from the first carrier so as to release the first carrier from the second carrier when the first carrier leaves the transverse section.

11. The conveying system according to claim 1, wherein:
the transverse section is a part of the second transfer system adjacent to the first transfer system; and
the first carrier is moved and secured to the second carrier at the transverse section.

12. The conveying system according to claim 11, wherein:
the first drive member has a first divided section and a second divided section;
the second magnetic engaging part of the first divided section is arranged on the first transfer system to move the first carrier along a path of the first transfer system; and
the second divided section is arranged on the second carrier.

13. The conveying system according to claim 12, further including:
a clutch, being configured to secure the first divided section and the second divided section.

14. The conveying system according to claim 11, wherein:
the second carrier has a positioning member with a fifth magnetic engaging part to its end, being configured to protrude from the second carrier interacting with the first magnetic engaging part of the first carrier to hold the first carrier.

15. The conveying system according to claim 12, wherein:
the second carrier has a positioning member with a fifth magnetic engaging part to its end, being configured to protrude from the second carrier indirectly interacting with the first magnetic engaging part of the first carrier via the second magnetic engaging part of the second divided section to hold the first carrier.

16. The conveying system according to claim 11, wherein:
the first magnetic engaging part has a magnetic rack, having a plurality of magnetic rack magnetic teeth, adjacent ones of the magnetic rack magnetic teeth having different polarities;
the second magnetic engaging part has at least one first magnetic gear connected to a shaft core member rotatable about an axis in the first transfer direction, respectively, wherein each first magnetic gear has a plurality of first magnetic gear magnetic teeth and adjacent ones of the first magnetic gear magnetic teeth have different polarities; and
the power is transmittable to the magnetic rack through the at least one first magnetic gear so as to move it along the first transfer direction.

17. The conveying system according to claim 15, further including:
a controller;
wherein:
the first drive member further has a motor whose output shaft is connected to the shaft core member; and
where the second carrier starts to move towards or away from the transverse section transferring the first carrier, the controller is adapted for controlling the motor to rotate the second magnetic engaging part in a compliant manner for a predetermined time interval.

18. The conveying system according to claim 13, wherein:
the transverse section has a releasing member, for pressing the positioning member away from the first carrier so as to release the first carrier from the second carrier when the first carrier leaves the transverse section.

19. The conveying system according to claim 14, wherein:
the transverse section has a releasing member, for pressing the positioning member away from the first carrier so as to release the first carrier from the second carrier when the first carrier leaves the transverse section.

* * * * *